Patented Sept. 3, 1946

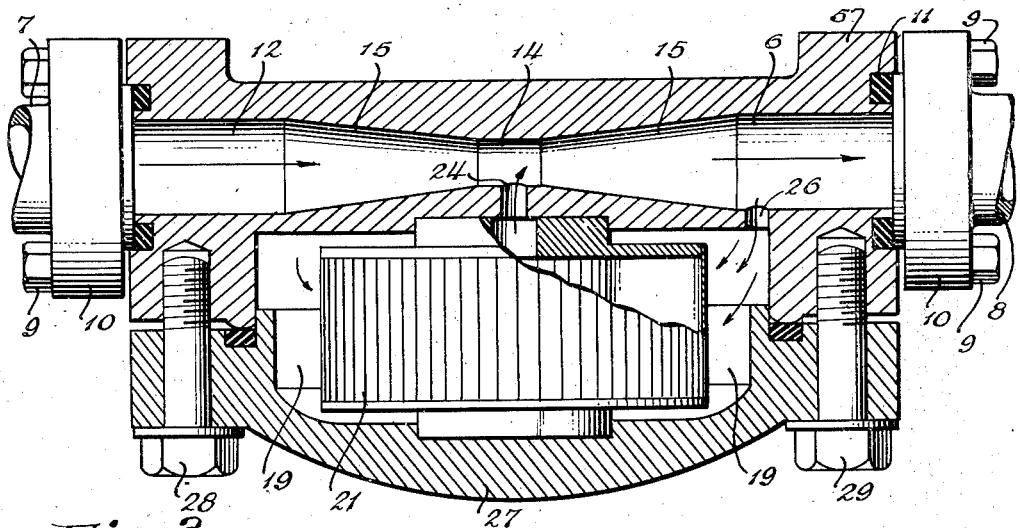
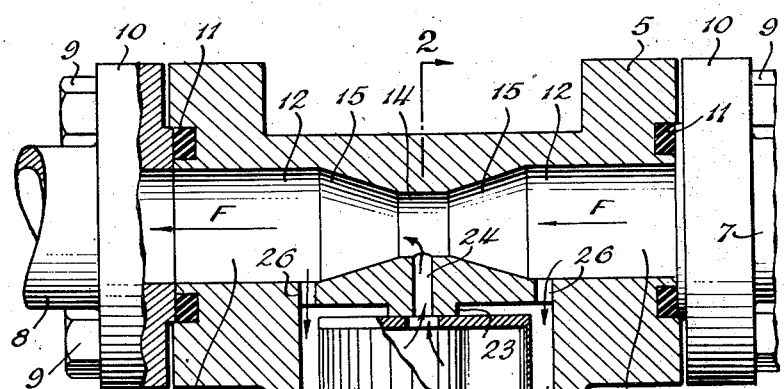

2,407,190

UNITED STATES PATENT OFFICE

2,407,190

FILTER FOR FLUID FLOW SYSTEMS

William O. Tait, Garden City, N. Y., assignor to Sperry Gyroscope Company, Inc., a corporation of New York Application June 30, 1944, Serial No. 542,855

4 Claims. (Cl. 210—164)

This invention relates to the art of filtering and is particularly concerned with a novel method of and apparatus for filtering fluids in reverse flow circulating systems. While the invention has a special utility in connection with high pressure hydraulic servo systems it has a wide range of application in filtering fluids in fluid circulating systems of all types.

For several reasons filtration of the working fluid in reversible flow high pressure systems has not heretofore appeared feasible. With the filtration methods previously tried, reversal of fluid flow in the system has meant a reversal of pressure within the filtering unit accompanied by the return of foreign particles and other previously removed substances to the main circulation channels of the system, a result highly undesirable. A similar result is produced in uniflow systems when excessive loading causes a temporary reversal of flow of the working fluid. Furthermore in high pressure systems a filtering element strong enough to resist system pressure frequently allows small but destructive foreign particles to pass through the filter and continue in circulation. There has also been the further difficult problem of obtaining a filtering rate high enough to effectively cleanse the fluid without unduly obstructing the flow of fluid through the system. In hydraulic systems used for control purposes, particularly if high pressures are used, any compressibility of the working medium introduces error into the operation of the controls. Obviously adding a filter to the system usually entails increasing the fluid content of the system, thus increasing the compressibility error above mentioned.

The novel apparatus and methods of the present invention overcome the above cited difficulties in the following ingenious manner. By introducing a constriction into the path of the main fluid stream, an increase in velocity and a reduction in the static pressure of the stream is created in the region of the constriction, the velocity of flow and the static pressure of the stream in regions removed from the constricted region being relatively little affected by this change in the shape of the channel through which the fluid passes. There is thus created a pressure difference between points located in the reduced diameter region and points located in the full diameter regions of the flow channel which is a function of the rate of stream flow and which operates to maintain the reduced diameter region at reduced static pressure irrespective of the direction of fluid flow in the constricted region of the flow channel. In other words, the pressure difference above mentioned is in the nature of a drop in static pressure between any section in the unconstricted region of the fluid channel and the throat of the channel whether that section be upstream or downstream of the throat. Hence, by operatively connecting a filter between any point subject to relatively high pressure and a point of reduced pressure in the flow channel, a filtering system is produced in which the pressure drop always occurs in the same direction irrespective of the direction of fluid flow in the other parts of the system, whereby a portion of the circulating fluid passes undirectionally through the filter even when a reversing fluid flow exists in the main flow channels of the system.

Since the pressure drop between the unconstricted and constricted regions of the fluid stream is independent of the actual working pressure of the system it is possible to control this pressure drop by judicious selection of the cross sectional area of the constricted region relative to the cross sectional area of the unconstricted section and thus keep the pressure drop across the filter small enough to prevent rupturing of the delicate filtering elements often used to remove small particles from the fluid in the system, even in installations where the working pressure is relatively high.

Moreover since the filtering element is located out of the main channel of flow and may be connected therewith by short, low resistance conduits, filtering of the system working medium is obtained with only a slight obstruction of the main channel of flow.

The compactness of the filtering system of the invention makes possible the filtering of the fluid without materially increasing the volumetric capacity of the system, hence the effect on the compressibility error of the system is kept at a minimum.

The objects of this invention may therefore be briefly enumerated as follows: the provision of a filter and associated circulatory system suitable for use in a reversible flow fluid system; the provision of a filter which may be used with high pressure fluid systems without danger of rupture of relatively delicate filtering materials or fine mesh screens; the provision of a filter having an associated circulatory or auxiliary filtering circuit arranged for minimum obstruction of the working passages of the fluid flow system in which it is used; the provision of filtering apparatus having the smallest fluid content consistent with effective filtering of the fluid in the system with which the filter is employed; the provision of a filtering method suitable for use in relatively high pressure fluid flow systems; the provision of a filtering system which will induce constant recirculation of the fluid through the filter, thus producing high filtering rate and effective cleansing of the fluid circulating through it; and the provision of filtering apparatus having no moving parts to wear rapidly or break loose and interfere with the operation of the system in which the filter is installed.

Other objects and uses of the invention will be apparent from the following description and the accompanying drawing wherein, Fig. 1 is a longitudinal section through one form of filter incorporating the principles of this invention.

Fig. 2 is a sectional view on the line 2—2 of Fig. 1 taken at right angles to the main path of fluid flow through the device of the invention, the filtering element being shown partly in elevation and partly in section.

Fig. 3 is a longitudinal section of a slightly modified version of the filter of Fig. 1, the filtering element being shown partly in section and partly in elevation.

The apparatus of the invention, in general, comprises a unit adapted to be inserted at a convenient point in the main path of flow of a closed circulatory system whose working substance or fluid may require filtering, this unit containing a passageway which permits the fluid to pass through with minimum obstruction of the fluid stream. In addition, means are provided for diverting a portion of the fluid from the main channel of flow into an auxiliary or local path of flow wherein the fluid is forced through a suitable filtering element and after cleansing is returned to the main channel of flow at a point where the cross section of this channel has been reduced for the purpose of creating a low pressure point in the main fluid stream. Thus, after filtering, the fluid in the auxiliary or filtering channel is returned to and intermingled with the fluid moving through the main passageways of the control or operating system.

As illustrated in Fig. 1, one form of apparatus in which the principles of the invention may be embodied comprises a main channel or body member 5 having a channel 6 for passing fluid completely through body member 5 from supply pipe 7 to return pipe 8 of the system with which the apparatus of the invention is employed, which pipes are secured for fluidtight connection to member 5 as by bolts 9 and flange 10 using packing glands or sealing rings 11 to prevent the escape of fluid from the interior of the system. Channel 6 is formed with a full diameter section 12 at each end thereof and with a throated or constricted section 14 intermediate the full diameter sections 12, typically with symmetrically tapered funnel-shaped passageways 15, on both sides thereof for connecting throat 14 to the full diameter or unconstricted sections 12, in the manner of a Venturi tube.

Channel member 5 also includes a hollow laterally projecting, externally threaded collar 16 upon which an internally threaded cap or cover plate 17 is adapted to be screwed so as to form, with the aid of sealing ring 18, a fluid tight connection. The chamber formed by collar 16 and cap 17 is appropriately shaped and properly sized to form a filtering chamber 19. Filtering chamber 19 may contain a replaceable cartridge type filtering element 21 held centrally secured therein by boss 22 on cap 17 and boss 23 on channel member 5, filtering element 21 being designed to provide a large filtering surface in a unit of compact dimensions.

Channel member 5 contains at least two, and if desired may contain more than two, lateral openings or conduits into filtering chamber 19, these openings being as short as possible and being shaped to provide free and unobstructed passage for the fluid between the main flow channel 6 and the filtering chamber 19. One of these lateral openings 24 which connects filtering chamber 19 to throat 14 serves as an exit conduit or outlet from the filtering chamber to the main channel of flow 6. One or more of these lateral openings 26 connects filtering chamber 19 to a point of low velocity and high static pressure such as sections 12 or any relatively high pressure point located elsewhere in the main channels of flow; such connection or connections serve as inlets to lead fluid from channel 6, to filtering chamber 19, where the fluid is cleansed by passing through filtering element 21, thereafter flowing back to channel 6 by way of lateral opening 24. This invention provides apparatus characterized by marked simplicity and highly effective filtering performance which is obtained with a negligible increase in the resistance to the flow of the working substance through the passageways of the system.

In operation, fluid under high static pressure enters channel 6 or member 5 from supply pipe 7, and flows, for example as shown by arrow F in Fig. 1, from the unconstricted section 12 at the right hand end of channel 6, through the tapered approach passageway 15 into throat 14, out of throat 14 through the tapered exit passageway 15 into the unconstricted section 12, at the left hand end of channel 6, from which region it then flows into return pipe 8. As the fluid passes from the upstream, unconstricted section 12 into the throat 14, it experiences an increase in its velocity of flow and a decrease in its static pressure; as it continues on its way flowing back into the downstream, unconstricted section 12, the reverse phenomenon occurs, the velocity of stream flow decreases and the static pressure of the fluid increases until it is again at the original value, except for slight frictional losses. It will be noted that the pressure differential thus created between the unconstricted regions of the channel of flow and the constricted region 14 is always in the nature of a fall in static pressure; and this is true whether the unconstricted region 12 be upstream or downstream of throat 14. The lateral openings 26, being connected to regions of relatively high pressure 12, will always be inlet passageways to filtering chamber 19, and lateral opening 24 being connected to the region of relatively low static pressure, i. e., throat 14, will always be the outlet passageway for filtering chamber 19, irrespective of whether the fluid is flowing from right to left or vice versa in channel 6. A unidirectional flow of fluid through inlets 26, filtering element 21, and outlet 24 is thus provided that is not affected by a reversal of flow through channel 6. Hence any foreign particles removed from the fluid stream by filter 21 will not be discharged back into the working fluid of the system by a reversal of the direction of flow in the system. Moreover, since the magnitude of the pressure differential created between throat 14 and the full diameter regions 12 at the mouths of the Venturi section in channel 6, is a function of the velocity of flow at these points, the apparatus of the invention provides a convenient means for creating a safe pressure differential across a selected filtering element irrespective of whether the system operating pressure is above or below the rupturing pressure of the particular filtering element. Filtering of minute particles from the working fluids in relatively high pressure systems thus becomes practicable through the use of this invention.

It will be readily discerned that locating the filtering chamber and filtering element below the Venturi section of the main flow channel results in two additional advantages. Firstly, any foreign particles which do not adhere to the filtering element will fall to the bottom of the filtering chamber rather than pass back into the main fluid stream as they would do if the filter were above rather than below the main flow channel. Secondly, since air is lighter than the working medium ordinarily used in such systems, any bubbles of air which may accumulate on the exterior of the filtering element are free to rise back into the main flow channel during periods when the fluid in this channel is motionless, thus providing a self-venting filter.

Tests of the above described filtering device have shown that a pressure difference as low as 20 lb. per square inch may be obtained across the filter in a system where the load pressure reaches as high as 2000 lbs. per square inch, and that particles with dimensions as small as 10 microns may be filtered out of the working fluid by the apparatus of invention.

The version of the invention illustrated in Fig. 3 is but slightly different from the device of Fig. 1. In the Fig. 3 version the taper of the approach and recession passageways of the Venturi section is more gradual and a cover plate 27 secured to channel member 5 by holding bolts 28, 29 is used in place of screw threaded cap 17 of Fig. 1. Otherwise a slight difference in physical dimensions is the feature primarily distinguishing the Fig. 3 filter from the Fig. 1 filter. In use, these two versions of the invention exemplify the same operating principle.

Since the above described inventive concept could be readily embodied in many apparently different physical forms without departing from the scope of this invention, it is intended that all matter contained in the specification or shown in the accompanying drawing be interpreted in an illustrative and not in a limiting sense.

Having thus illustrated the manner in which the principles of this invention may be applied, what is claimed is:

1. A filter for closed fluid flow systems comprising a body member arranged for fluidtight attachment to spaced conduit terminals of said system, a main flow channel passing through said body member, a symmetrically tapered Venturi section having equal angles of approach and recession centrally located in said flow channel, a hollow externally threaded collar integral with and projecting laterally from said body member, an internally threaded cap adapted for fluidtight attachment to said collar, a filtering chamber formed by said collar and said cap, a replaceable filtering element rigidly positioned between centrally located bosses in said filtering chamber, a small bore centrally located lateral fluid passageway between the throat of said Venturi section aid said filtering chamber, and a pair of small bore lateral fluid passageways between said filtering chamber and points on said main flow channel adjacent the tapered portions and equispaced from the throat of said Venturi section, thus providing a simple, rugged filter particularly suitable for use in relatively high pressure fluid flow systems.

2. A filtering device for filtering fluid comprising a conduit section adapted to form a part of a closed fluid-circulating system and shaped to provide a venturi responsive to flow in either direction to produce a reduced static pressure and increased velocity of the fluid at one point in said conduit, an auxiliary passage leading from another point in the same conduit as the first point but in a region of higher static pressure and discharging into the conduit at said one point, and a filtering element in said passage whereby a portion of the fluid flowing in the system is directed through the filtering element always in the same direction while flow in the system takes place in either direction.

3. A filtering device for filtering fluid comprising a conduit section adapted to form a part of a closed fluid-circulating system and shaped to provide a reduced-diameter throat and two oppositely directed and symmetrical tapered sections forming a venturi responsive to flow in either direction to produce a reduced static pressure and increased velocity of the fluid at said throat, an auxiliary passage leading from a point in said conduit adjacent the outer end of one tapered section and discharging into the conduit at said throat, and a filtering element in said passage whereby a portion of the fluid flowing in the system is directed through the filtering element always in the same direction while flow in the system takes place in either direction.

4. A filtering device for filtering fluid comprising a conduit section adapted to form a part of a closed fluid-circulating system and shaped to provide a venturi responsive to flow in either direction to produce a reduced static pressure and increased velocity of the fluid at one point in said conduit, means forming a filter chamber at one side of the conduit section, an outlet from the chamber comprising a short direct passage to said one point, an inlet to the chamber comprising a passage leading from another point of higher static pressure in the conduit section, and a filtering element removably positioned in the chamber whereby a portion of the fluid flowing in the system is directed through the filtering element always in the same direction while flow in the system takes place in either direction.

WILLIAM O. TAIT.